United States Patent Office 3,085,077
Patented Apr. 9, 1963

3,085,077
AQUEOUS DISPERSION COMPRISING A MALEIC ANHYDRIDE DIVINYL ETHER COPOLYMER
John D. Floyd, Wilmington, Del., assignor to Hercules Powder Company, Wilmington, Del., a corporation of Delaware
No Drawing. Filed June 29, 1960, Ser. No. 39,459
9 Claims. (Cl. 260—29.7)

This invention relates to improved aqueous dispersions of finely divided solids and to the process of preparing such dispersions.

Aqueous dispersions of finely divided solids have, in the past, been prepared with various dispersing agents. For example, complex polyphosphates, salts of polyacrylic acid, ethylene-maleic anhydride copolymers, vinyl methyl ether-maleic anhydride copolymers, styrene-maleic anhydride copolymers, etc., have been used as dispersing agents with less than completely satisfactory results.

It has now been discovered that the salts of the copolymers prepared from divinyl ether and maleic anhydride in a mole ratio of 1:2 and having an average molecular weight within the range of from about 500 to about 40,000, and most preferably below about 10,000, are more efficient in dispersing finely divided nonacidic solids than the prior art dispersing agents. By the efficiency of a dispersing agent is meant its ability to improve the viscosity-solids content relationship of a dispersion, i.e. the more efficient the dispersing agent, the greater the amount of finely divided solids that can be added to a given volume of liquid without increasing appreciably its viscosity.

Accordingly, the present invention relates to a stable aqueous dispersion of ingredients including a finely divided nonacidic solid that is not per se dispersible in water and a minor amount of a dispersing agent consisting essentially of a water-soluble salt of a linear copolymer of divinyl ether and maleic anhydride, said copolymer containing divinyl ether and maleic anhydride in a mole ratio of 1:2 and having an average molecular weight of from about 500 to about 40,000.

The divinyl ether-maleic anhydride copolymers used in the dispersions of this invention are linear, have an average molecular weight of from about 500 to about 40,000, and preferably from about 1,000 to about 10,000, and may be visualized as follows:

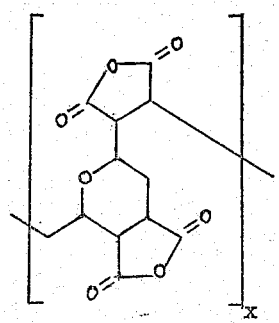

In addition the copolymers are completely water soluble, no cross-linked or network structure existing in solution.

These copolymers are useful as dispersing agents in the form of alkali metal salts such as the sodium salt, potassium salt, etc.; ammonia salts; half amide-half ammonia salts or volatile amine salts such as the N-methylmorpholine salt, trimethylamine salt, triethylamine salt, triethanolamine salt, etc.; mixed salts containing one of the aforementioned tertiary amines and a low molecular weight primary or secondary amine, etc. In general, when preparing the salt, sufficient salt-forming component is added to the divinyl ether-maleic anhydride copolymer to completely hydrolyze the anhydride groups. However, an efficient dispersing agent can be prepared from the copolymer when using less than a stoichiometric amount of a salt-forming component.

Any finely divided nonacidic solid can be dispersed in accordance with this invention. By finely divided is meant particles ranging in size from about 0.01 micron to about 1 mm. in diameter. Exemplary of the finely divided solids that can be dispersed are the inorganic pigments such as titanium dioxide, red iron oxide, black iron oxide, calcium carbonate, calcium sulfate, zinc oxide, zinc sulfide, barium sulfate, etc.; extender clays such as kaolin, etc.; organic polymers such as the polyolefins, polyesters, polyamides, melamines, phenolic resins, etc.; and halogenated organic polymers such as poly[bis(3,3-chloromethyl)oxetane], etc.

In carrying out the process of this invention, the dispersions can be prepared by various methods. For example, the dry finely divided solid can be mixed with a minimum amount of water to form a paste and then a dilute aqueous solution of the salt of the copolymer can be added. By another method, the finely divided solid and the salt of the copolymer can be premixed in the dry state and then water added. By still another method, the finely divided solid can be premixed with the copolymer in the dry state and then the salt of the copolymer formed in situ by adding an aqueous solution of the salt-forming component.

The amount of the dispersing agent required for fluidity depends primarily on the molecular weight of the divinyl ether-maleic acid copolymer whose salt is used as the dispersing agent and on the nature of the finely divided solid to be dispersed, but will be within the range of from about 0.05 percent to about 1.0 percent by weight (based on the total weight of solids). In general, the higher the molecular weight of the copolymer, the greater the amount that must be used to obtain fluidity (i.e. complete dispersion).

The copolymers used in the dispersions of this invention are produced by copolymerizing divinyl ether and maleic anhydride in an aromatic diluent at a 1:2 mole ratio using a free-radical initiator as shown in the following examples.

*Example 1*

A polymerization vessel was charged with 9.8 parts of maleic anhydride, flushed with nitrogen and then charged with 66 parts of nitrogen-sparged benzene. After dissolution of the maleic anhydride 3.46 parts of distilled divinyl ether, 0.0048 part gaseous oxygen and 1.08 parts of bromotrichloromethane were added. Then with vigorous agitation there was added 0.029 part of triethylborine, $(C_2H_5)_3B$, as a one molar solution in heptane. Within 10 seconds copolymerization started. The solution became cloudy and then gelatinous. After 23 hours at 25° C. the reaction stopped and the reaction mixture was repeatedly extracted with benzene and then dried under vacuum. The resulting divinyl ether-maleic anhydride copolymer was a white powder amounting to 11.1 parts and represented a conversion of 84.4 percent. The divinyl ether and maleic anhydride were present in the copolymer in the mole ratio of 1:2. From the viscosity of the copolymer in one molar aqueous sodium hydroxide, its average molecular weight was calculated as 3,000.

*Example 2*

A polymerization vessel was charged with 9.9 parts of maleic anhydride, a mixture of 65 parts of cumene and 22 parts of benzene and heated to reflux while sparging with nitrogen. Then 3.5 parts of divinyl ether followed by 0.063 part benzoyl peroxide dissolved in 4 parts of benzene were added. The reaction was maintained at a temperature of between 75° C. and 93° C. for one hour, after which it was allowed to cool. The resulting creamy white slurry was diluted with 90 parts of benzene and centrifuged. The centrifuge cake was washed with benzene and then dried under vacuum. The resulting divinyl ether-maleic anhydride copolymer amounted to 9.37 parts and represented a conversion of 70.5 percent. The divinyl ether and maleic anhydride were present in the copolymer in the mole ratio of 1:2. From the viscosity of the copolymer in one molar sodium hydroxide, its average molecular weight was calculated as 6,000.

It will be understood that by conducting the copolymerization under various reaction conditions in the presence of different free-radical initiators and in the presence or absence of chain transfer agents (e.g. $CCl_4$, $BrCCl_3$, etc.) copolymers having molecular weights ranging from about 500 to about 150,000 or above can be prepared.

The preparation of typical aqueous dispersions is presented in the following examples for purposes of illustration, parts and percentages being by weight unless otherwise specified.

In the examples the activity of the salts of the copolymers as dispersing agents was tested by a fluidity titration procedure. This procedure is described by G. Allyn et al., Official Digest, volume 27, No. 367, page 524, August 1955, published by Federation of Paint and Varnish Production Clubs.

*Example 3*

A stiff paste was prepared by mixing 25 parts of rutile titanium dioxide, having a particle size of about 0.5 to about 2 microns, with 15 parts of water. By a fluidity titration it was determined that 2.0 parts of a 1% aqueous solution (equivalent to 0.02 part of dispersing agent) of a sodium salt of a divinyl ether-maleic anhydride copolymer having an average molecular weight of 1800 were required to give fluidity to the titanium dioxide particles. In the absence of the copolymer dispersing agent, an additional 25 parts of water were required to give the same degree of fluidity.

The aqueous solution of the copolymer dispersing agent used in this example was prepared by dusting the dry divinyl ether-maleic anhydride copolymer into a solution containing a slight exces of sodium hydroxide.

*Example 4*

A stiff paste was prepared by mixing 25 parts of red iron oxide, having a particle size of about 0.5 to about 5 microns, with 20 parts of water. By a fluidity titration it was determined that 4.5 parts of a 1% aqueous solution (equivalent to 0.045 part of dispersing agent) of an ammonium salt of a divinyl ether-maleic anhydride copolymer having an average molecular weight of 2,200 were required to give fluidity to the iron oxide particles. In the absence of the copolymer dispersing agent, an additional 35 parts of water were required to give the same degree of fluidity.

*Example 5*

A stiff paste was prepared by mixing 25 parts of calcium carbonate, having a particle size of about 2 to about 20 microns, with 10 parts of water. By a fluidity titration it was determined that 1.2 parts of a 1% aqueous solution (equivalent to 0.012 part of dispersing agent) of a triethylamine salt of a divinyl ether-maleic anhydride copolymer having an average molecular weight of 2000 were required to give fluidity to the calcium carbonate particles. In the absence of the dispersing agent, an additional 6 parts of water were required to give the same degree of fluidity.

*Example 6*

A stiff paste was prepared by mixing 46 parts of poly-[bis(3,3-chloromethyl)oxetane] (specific gravity 1.4, crystalline melting point 181° C.), having a particle size of about 40 to about 60 microns, with 46 parts of water. When 6.5 parts of a 10% aqueous solution of a sodium salt of a divinyl ether-maleic anhydride copolymer having a molecular weight of 2000 was added to the paste with stirring, a stable dispersion was obtained which could be sprayed by ordinary paint spraying techniques. To obtain the same degree of fluidity in the absence of dispersing agent, 30 additional parts of water were required.

*Example 7*

Two samples of a stiff paste were prepared by mixing rutile titanium dioxide having a particle size of about 0.5 to about 2 microns with water. Each sample contained 25 parts of titanium dioxide and 15 parts of water.

One percent aqueous solutions of the ammonium salt, of divinyl ether-maleic anhyride copolymer having a molecular weight of 20,000 and vinyl methyl ether-maleic anhydride copolymer having an average molecular weight of 20,000 were prepared. By fluidity titrations it was determined that 3.1 parts of the solution of the ammonium salt of the divinyl ether-maleic anhydride copolymer were required to give fluidity to the first sample of titanium dioxide paste while 7.9 parts of the solution of the ammonium salt of the vinyl methyl ether-maleic anhydride copolymer were required to give the same fluidity to the second sample of titanium dioxide paste. It can be seen from the above that the divinyl ether-maleic anhydride copolymer dispersing agent is more than twice as efficient as the vinyl methyl ether-maleic anhydride copolymer dispersing agent.

*Examples 8–11*

Four samples of a stiff paste were prepared by mixing rutile titanium dioxide having a particle size of about 0.5 to about 2 microns with water. Each sample contained 25 parts of titanium dioxide and 15 parts of water.

Four aqueous solutions of sodium salts of different molecular weight divinyl ether-maleic anhydride copolymers each having a concentration of 1.0 percent, were prepared. The molecular weight of each copolymer and the parts required to give fluidity to a sample of titanium dioxide paste are tabulated below:

| Example No. | Molecular weight | Parts of copolymer required for fluidity |
|---|---|---|
| 8 | 5,000 | 0.022 |
| 9 | 20,000 | 0.040 |
| 10 | 40,000 | 0.052 |
| 11 | 150,000 | (¹) |

¹ Pigment flocculated—paste became more stiff on addition of polymer.

It can be seen from the above examples that those linear copolymers of divinyl ether and maleic anhydride within a limited range of molecular weight (from about 500 to about 40,000) are excellent dispersing agents. The molecular weight is critical, since those copolymers having a molecular weight above about 40,000 are inefficient dispersing agents and those above about 100,000 cause flocculation.

The dispersions of this invention can contain one or more other ingredients such as dyes, dryers, pigments, plasticizers, etc., but the presence or absence of such ingredients is immaterial to the invention.

These dispersions can be used without further modification, for example, in aqueous vehicles for protective coatings, printing, dyeing, paper coating, carpet back sizing, ceramics, cosmetics, etc.

What I claim and desire to protect by Letters Patent is:

1. A stable, fluid, aqueous dispersion of ingredients including a finely divided nonacidic solid that is not per se dispersible in water and a minor amount of a dispersing agent consisting essentially of a water-soluble salt of a linear copolymer, said copolymer consisting of divinyl ether and maleic anhydride in a mole ratio of 1:2 and having an average molecular weight of from about 500 to about 40,000.

2. The dispersion of claim 1 wherein the water-soluble salt is selected from the group consisting of alkali metal salts, ammonium salts, half amide-half ammonium salts and volatile amine salts.

3. The dispersion of claim 1 wherein the water-soluble salt is a sodium salt.

4. The dispersion of claim 1 wherein the water-soluble salt is an ammonium salt.

5. The dispersion of claim 1 wherein the water-soluble salt is a triethylamine salt.

6. In the process of preparing a stable, fluid, aqueous dispersion of a finely divided nonacidic solid in an aqueous medium wherein a dispersing agent is added to give fluidity, the improvement which comprises adding as the dispersing agent a minor amount of a water-soluble salt of a linear copolymer, said copolymer consisting of divinyl ether and maleic anhydride in a mole ratio of 1:2 and having an average molecular weight of from about 500 to about 40,000.

7. The process of claim 6 wherein the salt is a sodium salt.

8. The process of claim 6 wherein the salt is an ammonium salt.

9. The process of claim 6 wherein the salt is a triethylamine salt.

References Cited in the file of this patent

UNITED STATES PATENTS

| | | |
|---|---|---|
| 2,548,318 | Norris | Apr. 10, 1951 |
| 2,798,053 | Brown | July 2, 1957 |